(12) United States Patent
Wakabayashi et al.

(10) Patent No.: US 6,355,336 B1
(45) Date of Patent: Mar. 12, 2002

(54) MULTI-LAYER PACKAGING FILM

(75) Inventors: Nobukatsu Wakabayashi; Ken Honma, both of Hiratsuka (JP)

(73) Assignee: Mitsubishi, Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 09/460,330

(22) Filed: Dec. 10, 1999

(30) Foreign Application Priority Data

Dec. 15, 1998 (JP) .............................. 10-355845

(51) Int. Cl.$^7$ .................. B32B 27/08; B32B 27/32; B32B 27/36
(52) U.S. Cl. ............... 428/215; 428/35.7; 428/213; 428/480; 428/483; 428/515; 428/516; 428/523; 428/910; 264/173.11; 264/173.12; 264/173.15; 264/288.4; 264/290.2
(58) Field of Search .................. 428/34.9, 35.2, 428/35.7, 212, 213, 215, 216, 480, 483, 515, 516, 520, 522, 910, 523; 264/173.16, 290.2, 288.4, 173.11, 173.12, 173.15

(56) References Cited

U.S. PATENT DOCUMENTS

| 4,188,443 A | * | 2/1980 | Mueller et al. ............ 428/216 |
| 4,274,900 A | * | 6/1981 | Mueller et al. ............ 156/229 |
| 4,286,011 A | * | 8/1981 | Wong ........................ 428/220 |
| 4,311,741 A | * | 1/1982 | Wong .......................... 428/35 |
| 4,551,368 A | * | 11/1985 | Smith et al. ................ 428/35 |
| 4,612,221 A | * | 9/1986 | Biel et al. ................... 428/35 |
| 5,096,653 A | * | 3/1992 | Nedzu ....................... 264/564 |

OTHER PUBLICATIONS

Schmitz, Peter et al., "Films." Ullmann's Encyclopedia of Industrial Chemistry, 5th Ed., vol. A11, pp. 85–110, Jan. 1988.*

* cited by examiner

Primary Examiner—Vivian Chen
(74) Attorney, Agent, or Firm—David G. Colin; Dike, Bronstein, Roberts & Cushman, IP Group; John B. Alexander

(57) ABSTRACT

The present invention relates to a multi-layer packaging film comprising an intermediate layer having at least one outer layer on both surfaces of the intermediate layer, and having the thickness of not more than 40 $\mu$m, said outer layer comprising a polyolefin resin, said intermediate layer comprising a polytetramethylene terephthalate resin obtained by copolymerizing polytetramethylene oxide glycol having a number-average molecular weight of 300 to 5,000 and having an intrinsic viscosity of 0.7 to 2.0, a melting point of 200 to 228° C. and a crystallization temperature of not higher than 180° C., and the thickness of said intermediate layer being 20 to 80% of the thickness of the multi-layer film.

13 Claims, No Drawings

MULTI-LAYER PACKAGING FILM

BACKGROUND OF THE INVENTION

The present invention relates to a multi-layer packaging film, more particularly it relates to a multi-layer packaging film suited for use as stretch film, domestic wrapping film and such designed to be used for food packaging and similar purposes.

There are known the packaging films using a polyvinylidene chloride resin or a polyvinyl chloride resin as main constituting material, but the films which are safe in use and free of the problem of environmental pollution in disposal after use are desired, and recently the films made of polyolefin resins and other halogen-free resins such as polyethylene and polymethylpentene are used depending on their properties.

These films are popularly used for food packaging when, for instance, foods are sold at retail shops in the process of distribution or stored as in a refrigerator at household. They are also used for wrapping foods when they are placed in a microwave oven for warming them up. In this case, concerning the film properties, it is preferable that the films have adhesive properties or tackiness to the vessels and won't be fused, ruptured, whitened, discolored, denatured, shrunk excessively or damaged in other forms when exposed to high temperatures.

However, the films comprising polyvinylidene chloride resins have disadvantages in that they are shrunk excessively when heated, while the films comprising polyvinyl chloride resins are at a disadvantage in that they are whitened when brought into contact with boiling water.

Also, the polyolefin resins, although comparatively inexpensive and excellent in safety to foods and permeability to water, are unsatisfactory in oxygen gas barrier properties, low in strength and heat resistance, and especially poor in oil resistance when heated, and the films made of such resins may be swollen or fused when heated with an oleaginous food packaged therein. Thus, the polyolefin resins are not suited for uses in cooking by heating.

The stretched film of polyethylene terephthalate is known as a film with excellent heat resistance. This film has high strength and rigidity, but it is unsatisfactory in flexibility, weak in adhesiveness to the vessels when used as a wrapper, and also defective in cutting properties (easiness to cut): it cannot be cut smoothly by a blunt cutter such as provided to a domestic food wrapper.

Proposals have been made for improving these defects. For example, Japanese Patent Application Laid-open (KOKAI) Nos. 5-116262 and 6-262738 disclose the multi-layer wrapping films comprising an intermediate layer composed of a polyethylene terephthalate resin and inner and outer layers composed of a polypropylene resin.

In manufacture of such multi-layer films, however, it is necessary to raise the temperature for the film molding process to the level of 280 to 300° C. or even higher, which poses the problem on stabilized work of co-extrusion with the polyolefin which is low in melting temperature. Further, a high temperature such as 90 to 130° C. is required in the film stretching step, giving rise to the problems that the polyolefin used is liable to decompose, and that the produced laminated films tend to become sticky.

SUMMARY OF THE INVENTION

The present invention aims at providing a multi-layer wrapping film having excellent transparency, adhesiveness, heat resistance, gas barrier properties, non-heat-shrinkability and easiness to cut, and also excelling in the matter of food sanitation and environmental safety in practical use.

To attain the above aim, in the first aspect of the present invention, there is provided a multi-layer packaging film comprising an intermediate layer having at least one outer layer on both surfaces of the intermediate layer, and having the thickness of not more than 40 μm, said outer layer comprising a polyolefin resin, said intermediate layer comprising a polytetramethylene terephthalate resin having an intrinsic viscosity of 0.7 to 2.0, a melting point of 200 to 228° C. and a crystallization temperature of not higher than 180° C., and the thickness of said intermediate layer being 20 to 80% of the thickness of the multi-layer film.

DETAILED DESCRIPTION OF THE INVENTION

The present invention is described in detail below.

The polytetramethylene terephthalate resin constituting the intermediate layer in the multi-layer packaging film of the present invention has an intrinsic viscosity in the range of 0.7 to 2.0. If the intrinsic viscosity of the said resin is less than 0.7, the produced film may be unsatisfactory in elongation, and it also becomes difficult to form a film. If the intrinsic viscosity of the said resin exceeds 2.0, the melting point of the resin elevates, which may cause heat deterioration of the polyolefin resin constituting the outer layers when the polytetramethylene terephthalate resin is co-extruded with the polyolefin resin, resulting in the impaired appearance of the produced film. The preferred range of intrinsic viscosity of the polytetramethylene terephthalate resin is 0.75 to 1.8, more preferably 0.8 to 1.6. The intrinsic viscosity referred to in the present invention was determined by dissolving 0.5 g/100 ml of the resin in a 50/50 (by weight) mixed solvent of 1,1,2,2-tetrachloroethane and phenol, and measuring the solution viscosity at 30° C.

The melting point of the said polytetramethylene terephthalate resin is 200 to 228° C. if the melting point of thereof is below 200° C., the produced film may be not provided with desired heat resistance. It is usually hard to obtain a resin having a melting point exceeding 228° C. The preferred range of melting point of the polytetramethylene terephthalate resin is 205 to 228° C. In the present invention, the melting point was determined from the peak value of crystalline melting point of the resin measured by a differential scanning calorimeter (DSC) at a heating rate of 20° C./min.

The crystallization temperature of the polytetramethylene terephthalate resin is not higher than 180° C. If the crystallization temperature exceeds 180° C., the polytetramethylene terephthalate resin tends to crystallize when it is joined with the polyolefin resin in the extruder die during co-extrusion process, making it hard to obtain a transparent film. Also, in this case, the extrusion work tends to become unstable. The preferred range of crystallization temperature is 140 to 175° C. The crystallization temperature was determined from the peak value of crystallization heat absorption temperature of the resin generated when the resin heated to 300° C. by DSC at a heating rate of 20° C./min and held at this temperature for 5 minutes was cooled down to 30° C. at a temperature lowering rate of 20° C./min.

As the polytetramethylene terephthalate resin constituting the intermediate layer of the multi-layer film of the present invention, there can be preferably used the polytetramethylene terephthalate resins in which the ratio of the polytetramethylene terephthalate units to the whole structural units is 70 to 100 mol %, for example, a polytetramethylene terephthalate resin in which the ratio of the polytetramethylene terephthalate units is 100%, a polytetramethylene terephthalate copolymer resin in which the ratio of the polytetramethylene terephthalate units is 70 to 99 mol %, and the blends of these resins.

The polytetramethylene terephthalate resins can be produced from polycondensation of terephthalic acid or its ester derivatives and tetramethylene glycol. A typical example of the terephthalic acid ester derivatives is dimethyl terephthalate.

As the dicarboxylic acid unit as a components of the polytetramethylene terephthalate copolymer resin, there can be used, beside the said terephthalic acid used as main component, other aromatic dicarboxylic acids, alicyclic dicarboxylic acids, aliphatic dicarboxylic acids and their ester derivatives. In view of mechanical properties and heat resistance, the amount of the aromatic dicarboxylic acid unit is preferably in an amount of not less than 50 mol %. The amount of the terephthalic acid unit is preferably not less than 70 mol %, more preferably not less than 80 mol % based on the total dicarboxylic acids unit.

Examples of the aromatic dicarboxylic acids include isophthalic acid, phthalic acid, 2,6-naphthalenedicarboxylic acid, 1,5-naphthalenedicarboxylic acid, bis(4,4'-carboxyphenyl)methane, anthracenedicarboxylic acid, and 4,4'-diphenyletherdicarboxylic acid. Examples of the alicyclic dicarboxylic acids include 1,4-cyclohexanedicarboxylic acid and 4,4'-dicyclohexyldicarboxylic acid, and examples of the aliphatic dicarboxylic acids include adipic acid, sebacic acid, azelaic acid and dimer acid. Of these dicarboxylic acids, phthalic acid or isophthalic acid is preferred.

As the glycol used for forming copolymer component, it is possible to use, beside tetramethylene glycol as main component, $C_2$–$C_{20}$ aliphatic or alicyclic diols and bisphenol derivatives such as alkylene oxide glycol and polyalkylene oxide glycol. The amount of tetramethylene glycol unit is preferably not less than 70 mol %, preferably not less than 80 mol % based on the total glycol unit.

Examples of the glycols usable in the present invention include ethylene glycol, propylene glycol, 1,5-pentanediol, 1,6-hexanediol, neopentyl glycol, decamethylene glycol, cylcohexanedimethanol, 4,4'-dihydroxycyclohexylmethane, 4,4'-dihydroxycyclohexylpropane, bisphenol A-ethylene oxide addition product diol, polyethylene oxide glycol, polypropylene oxide glycol, polytetramethylene oxide glycol, and mixtures thereof. Of these glycols, polytetramethylene oxide glycol is preferred.

Examples of the polytetramethylene terephthalate copolymer resins include polytetramethylene terephthalate copolymer resins obtained by copolymerizing polytetramethylene oxide glycol having a number-average molecular weight of 300 to 5,000, dimethyl isophthalate-copolymerized polytetramethylene terephthalate, and cyclohexanedimethanol-copolymerized polytetramethylene terephthalate. The melting point of the polytetramethylene terephthalate copolymer resin is preferably 200 to 224° C., more preferably 205 to 224° C.

As the polytetramethylene terephthalate copolymer resin, it is preferable to use the one obtained by copolymerizing polytetramethylene oxide glycol having a number-average molecular weight of 300 to 5,000 since this resin is low in Young's modulus and has excellent flexibility and high heat resistance. The more preferred range of number-average molecular weight of the said polytetramethylene oxide glycol is 500 to 3,000. If its molecular weight is less than 500, the said resin in unable to produce the desired flexibility-imparting effect, and if the molecular weight exceeds 3000, the resin deteriorates in compatibility, resulting in reduced transparency and/or heat resistance of the film.

The amount of polytetramethylene oxide glycol based on the total glycol moiety is preferably 0.5 to 30 mol %, more preferably 1 to 10 mol %. The said amount by weight in the copolymer resin, though variable depending on the molecular weight of polytetramethylene oxide glycol, is preferably 1 to 30 wt %, more preferably 3 to 20 wt % based on the total weight of glycol moiety.

To the polytetramethylene terephthalate resin may be added other substances, for example, an antioxidant such as a phosphite compound or hindered phenol and a heat stabilizer, but such substances are limited to those put on the Positive List for reasons of food sanitation.

As the polyolefin resin constituting the outer layers of the multi-layer packaging film of the present invention, there can be used, for example, polyethylene resins and polypropylene resins. A variety of polyethylenes can be used as the polyethylene resin. Examples of the polyolefin resins usable in the present invention include high-density polyethylenes, low-density polyethylenes (hereinafter abbreviated to LDPE), $C_4$–$C_8$ α-olefin-copolymerized polyethylenes (hereinafter abbreviated to LLDPE), $C_4$–$C_8$ α-olefin-copolymerized polyethylenes using a metallocene catalyst (hereinafter abbreviated to MLLDPE), ethylene/vinyl acetate copolymer resins and the like. Of these polyolefin resins, LDPE, LLDPE, MLLDPE and their mixtures are preferred. Other substances such as heat stabilizer, lubricant, tackifier, etc., may be added to the polyolefin resin as required.

The melt index (measured according to JIS K-6758 at 190° C. under a pressure of 2.16 kg, unit: g/10 min) of the polyethylene resin is preferably 0.5 to 20, more preferably 1 to 10, most preferably 2 to 8.

In the present invention, it is possible to use a variety of polypropylene resins, for example, copolymer polypropylene resins obtained by copolymerizing a small quantity of a homopolypropylene, ethylene, butene or the like. Examples of the homopolypropylenes usable here include isotactic polypropylene, syndiotactic polypropylene and atactic polypropylene. Isotactic polypropylene is preferred. The copolymer polypropylenes may be either random copolymers or block copolymers, the random copolymers being preferred.

The melt index (measured according to JIS K-6758 at 230° C. under a pressure of 2.16 kg, unit: g/10 min) of the polypropylene resin used in this invention is preferably 0.5 to 20, more preferably 1 to 10, most preferably 2 to 8.

In the multi-layer packaging film according to the present invention, it is preferable to provide an adhesive layer between each outer layer and the intermediate layer for strengthening adhesion between the outer and intermediate layers.

The adhesive used for such an adhesive layer is preferably the one which can provide an adhesive strength of not less than 0.5 N/15 mm (50 g/15 mm) at 23° C. or not less than 0.5 N/15 mm (50 g/15 mm) at 60° between the intermediate layer and the adhesive layer. If the adhesive strength is below the above-defined level, exfoliation or blistering tends to take place during molding of the film or packaging therewith or in use under a heated condition, as in a microwave oven.

The adhesive strength is measured in the following way. There are prepared the 50 μm thick single-layer films corresponding to the intermediate layer and the adhesive layer of the film respectively. These single-layer films were laminated to constitute an intermediate layer/adhesive layer/ intermediate layer structure, and the laminate was held between the 215° C. hotplates and pressed under a force of 0.2 MPa (2 kg/cm$^2$) for 2 seconds, and the T-peel strength of the obtained laminated film was measured at 23° C. at a rate of pulling of 50 mm/min.

The adhesive used in the present invention is preferably the one whose softening point is not lower than 50° C. or whose melting point is not lower than 80° C. If the softening point or melting point of the adhesive is below the above-defined level, workability in the film forming operation may deteriorate and trouble tends to arise in continuous extrusion, resulting in causing delamination of the film in its stretching step or unsatisfactory heat resistance of the film in its practical use.

As the adhesive, it is possible to use, for instance, modified polyolefin resins such as modified polyethylene and polypropylene resins obtained by copolymerizing or graft polymerizing the olefin monomers containing various types of polar groups, and other α-olefin copolymers.

The polar groups that can be contain ed in the olefin monomers include carboxyl group, acid anhydride group, hydroxyl group and epoxy group. Examples of the olefin monomers containing the polar groups include acrylic acid, methacrylic acid, maleic anhydride, 2-hydroxymethyl acrylate, 2-hydroxymethyl methacrylate, glycidyl acrylate, and glycidyl methacrylate.

As the components of the modified polyolefin resins, there can be used, beside the said polar group-containing olefin monomers, $C_4$-$C_{12}$ α-olefins, vinyl acetate, styrene, butadiene, isoprene, acrylic alkyl esters, methacrylic alkyl esters and the like.

The adhesives usable in the present invention also include those obtained by blending a tackifier in the polyolefin resins or modified polyolefin resins. As the tackifier, those obtained by blending rosin, cumarone resin, cumarone-indene resin, terpene resin or the like in a base material such as various types of rubber and acrylic resins.

It is possible to blend the said adhesive directly in the outer layers for strengthening adhesion between the intermediate layer and the outer layers. The amount of the adhesive to be blended is preferably 1 to 30 wt %, more preferably 3 to 20 wt % based on the weight of the outer layer.

The thickness of the multi-layer packaging film according to the present invention is not more than 40 μm. If the film thickness exceeds 40 μm, the film tends to lower in its wrapping performance. The preferred film thickness is 40 to 5 μm. If the film thickness is less than 5 μm, the film is unsatisfactory in strength and gas barrier properties. The more preferred range of thickness of the multi-layer packaging film of the present invention is 30 to 7 μm.

The thickness of the intermediate layer in the multi-layer packaging film of the present invention is 20 to 80%, preferably 30 to 70% of the overall thickness of the film. If the thickness of the intermediate layer is outside the above-defined range, the film tends to become non-uniform in thickness. The thickness ratio of one outer layer to the other provided on both sides of the intermediate layer is preferably in the range from 0.5 to 2, more preferably from 0.7 to 1.5. If the said thickness ratio is outside the above-defined range, the film forming stability in the extruding operation may be lowered and the obtained laminated film becomes liable to curl and deteriorates in its handling qualities In case where an adhesive layer is disposed, the thickness of the adhesive layer is preferably 5 to 30%, more preferably 10 to 25% of the overall thickness of the produced film.

Strength at 5% elongation of the multi-layer packaging film of the present invention is preferably 5 to 50 MPa (0.5 to 5.0 kg/mm$^2$). If its strength at 5% elongation is less than 5 MPa (0.5 kg/mm$^2$), the film is unsatisfactory in strength, and if it exceeds 50 MPa (5.0 kg/mm$^2$), the film tends to deteriorate in wrapping performance and easiness to cut.

The multi-layer packaging film of the present invention can be produced, for instance, by a method in which the film materials are co-extruded by a multi-layer T-die film forming machine or a multi-layer inflation film forming machine, then stretched and heat set. In case of forming a film according to such a system, the resins for forming the respective layers are melt extruded from the separately disposed extruders so as to have a desired film thickness, then guided into and successively joined in a multi-layer die through a joint, and extruded from a die lip to form a film.

Usually the single-screw extruders are used for the said multi-layer co-extrusion. As for the type of the screw to be used, a suitable screw is selected according to the type of the resin used. Usually a full-flighted screw with L/D ratio of 25 to 30 having a feed zone, a compression zone and a metering zone is used, but it is also preferable to use a screw further having a mixing zone for effecting good mixing of the materials. If necessary, a double-screw extruder may be used.

The extruder cylinder temperature setting is: usually 230 to 260° C. for the polytetramethylene terephthalate resin of the intermediate layer, 150 to 210° C. for the outer layer resin in the case of polyethylene resin and 190 to 230° C. in the case of polypropylene resin. In case where an adhesive layer is disposed, the cylinder setting temperature for the adhesive is 150 to 230° C. These setting temperatures are properly decided in consideration of the melting point and melt viscosity of the respective resins used. It is preferable to properly select the temperature gradient according to the screw shape so as to melt the resins under a stabilized extruding condition. The molten resins extruded from the respective extruders are led into a multi-layer die through an adapter joint, successively joined together, and co-extruded from a die lip to form a multi-layer film having the said layer structure.

The die temperature is around 235 to 250° C. in any cases of using a T-die or a circular die. A temperature not lower than the melting points of the resins used is preferred. It is also preferable to provide a proper temperature gradient by taking into account the extrusion temperatures for the respective resins. If the die temperature is below the melting points of the resins used, there may take place precipitation of crystals with the lapse of time, producing the risk of blockage of the die lip. In the present invention, temperature setting is made in line with the polytetramethylene terephthalate resin having the highest melting point among the resins used.

In the case of the T-die film forming system, the molten resin extruded from the die lip is wound around a 10 to 60° C. cooling drum and is thereby rapidly cooled and made into a film. A matte finished cooling roll may be used for bettering slip properties of the film. It is also possible to use the nip rolls for attaching the extrudate closely to the cooling roll or to provide an air knife.

According to the film forming process using a circular die, the molten laminated resin is extruded from the circular die under the same cylinder temperature setting as described above, blown up to a blow-up ratio of 0.7 to 1.7 by the deflation or inflation method and then air or water cooled, and the formed film is folded and taken up. In producing the multi-layer packaging film according to the present invention, water cooling method is more p referred for obtaining a transparent film.

The thickness of the multi-layer film formed after co-extrusion is usually about 50 to 200 μm, and the thickness of the intermediate layer of the multi-layer film after co-extrusion is about 20 to 80%, preferably about 30 to 70% of the overall thickness of the multi-layer film. The thickness of the outer layers put together is about 20 to 80%, preferably about 30 to 70% of the overall thickness of the film. If the thickness of the intermediate layer and/or that of the outer layers are outside the above-defined ranges, the film tends to become non-uniform in thickness.

The thickness ratio of one outer layer to the other outer layer is preferably in the range from 0.5 to 2.0, more preferably from 0.7 to 1.5. If the said thickness ratio exceeds the above-defined range, the film forming stability in the extruding operation lowers and the obtained multi-layer film tends to curl or deteriorate in handling properties. In case where an adhesive layer is disposed, the thickness of the adhesive layer is about 10 to 25% of the overall thickness of the multi-layer film.

The multi-layer film formed after co-extrusion is stretched to a thickness of not more than 40 μm. The non-stretched film is too great in elongation and unsatisfactory in cutting properties (easiness to cut). The structure of each layer of the non-stretched multi-layer film is not changed by stretching. Stretching may be either monoaxial or biaxial, and the stretch ratio may be optionally set, but usually the film is stretched 2 to 6 times in the machine direction and 0 to 3 times in the transverse direction. Here, the "machine direction" is the direction in which the formed film is taken up, and the "transverse direction" is the direction vertical to the take-up direction.

In stretching the film, the stretching conditions are adjusted so that the film will have elongation at break of at least 30%, preferably not less than 50%, as the produced multi-layer film is required to have appropriate stretchability in practical use. For obtaining the stretched film, it is possible to use either a method in which after T-die or circular die co-extrusion, the film is stretched monoaxially or biaxially, or a method in which the multi-layer film is once taken up and then stretched off-line.

The stretching operation is conducted for monoaxial stretching or successive or simultaneous biaxial stretching at the said ratio in an atmosphere with a temperature of from normal temperature to 90° C., preferably about 40 to 80° C., and the stretched film is heat-set at 120 to 200° C. for 60 to 5 seconds to obtain a monoaxially or biaxially stretched film. Various stretching methods such as longitudinal roll stretching, transverse tenter stretching, combination thereof, and blow stretching can be used in the present invention.

The multi-layer film according to the present invention is particularly suited for use as a stretch film for commercial use, such as for packaging foods, or as a wrapping film for domestic use.

Thus, the multi-layer film of the present invention has excellent transparency, adhesiveness, heat resistance, gas barrier properties, non-heat-shrinkability and cutting quality (easy to cut), and also excels in food sanitation and environmental safety. The term "stretch film" used in the present invention refers to the films used for the purpose of packaging materials, especially foods, for example, for packaging perishable foods or daily dishes such as sold at the retail stores in the super markets, by placing them in a container such as tray molded from polystyrene, polypropylene, paper, etc., or for packaging such foods directly into the film by stretching it out either manually or by mechanical means without using any container. If necessary, the film may be sealed by a hot plate or other means. The film used for such purposes, especially for packaging an object, needs to be easily stretchable, but it is preferable that such a film is limited in elongation and is enough firm so that the material (such as food) contained therein won't be allowed to move and get loose during transport or on display.

The "wrapping film for domestic use" means a film used for wrapping up food when it is kept in a refrigerator or heated in a microwave oven. Such a film is required to have certain specificities; for example, it is required that such a film can be easily cut by a cutter (serration) made of a material having no rigidity such as paper, that the film can adhere closely to the food container, and that the film can withstand heat of about 120 to 160° C.

This film preferably has no "head" and "tail" since there are few cases where the film is used by making distinction between the head and the tail.

The multi-layer packaging film according to the present invention has excellent heat resistance, gas barrier properties, impermeability to moisture, odor barrier properties, heat stability, flexibility, easiness to cut and transparency, and also excels in respect of food sanitation and environmental safety, so that it is useful for packaging of foods, machine parts, electronic parts, etc., and exhibits its high utility value in application to a wide variety of commercial products. In the production of the multi-layer packaging film of the present invention, a specific polytetramethylene terephthalate resin is used for the intermediate layer. This has the effect of relatively reducing the difference in melting temperature between the intermediate and outer layer resins as compared to the case of using a polyethylene terephthalate resin. Consequently, extrusion stability is bettered and a multi-layer packaging film with little risk of rupture and other troubles and having good appearance can be obtained.

EXAMPLES

The present invention is further explained by reference to the following examples, but it should be noted that these examples are merely intended to be illustrative and not to be construed as limiting the scope of the invention.

The evaluation methods used in the following Examples and Comparative Examples are described below.

(1) Film Strength at 5% Elongation (which may hereinafter be referred to as "F5 value")

A 15 mm wide test piece was cut out of the film and pulled at a rate of 4 mm/min with the chuck interval adjusted to 200 mm in a 23° C. thermostatic chamber and the film strength at the point when elongation reached 10 mm (5%) was measured and expressed as F5 value (unit: MPa).

(2) Tensile Elongation at Break and Elongation at Break

The test piece similar to the one used in (1) was pulled at a rate of 200 mm/min in both longitudinal and transverse directions, measuring elongation at break in both directions, and the ratio of longitudinal/transverse elongation was determined.

(3) Film Haze

This was measured by a hazeometer according to JIS K 6718. Usually there is no problem in recognizing the contained material in the packaging film when its haze is not more than 5%.

(4) Cutting Quality (easiness to cut)

The film was cut in its longitudinal direction by applying perpendicularly thereto the "serration" of a commercially sold domestic wrap. Judgment was made on whether or not the film could be cut easily along the serration. The film which could be cut easily was marked with "○" and the film which was ruptured or ripped without conforming to the serration was marked with "X".

(5) Wrapping Performance

Stew of normal temperature was poured into a porcelain soup plate and wrapped up with a wrapping film. After attaching the film tightly to the peripheral edge of the plate, the wrapped plate was slanted and observed to see whether or not there took place outflow of the content. The film which did not allow outflow of the content was marked with "○" and the film which exfoliated to cause outflow of the content was marked with "X".

(6) Microwave Oven Test 1 (Hot water resistance test)

Water was poured into a porcelain cup (150 cc) to fill approximately 70% of its capacity, and the cup was covered with a wrapping film. After attaching the film tightly to the peripheral edge of the cup, the cup was placed in a microwave oven (high frequency output: 500 W) and treated therein for 2 minutes. The film was blistered by the internal pressure as the time passed, and water boiled in about one minute and 40 seconds. The cup was taken out and the condition of the film was observed to see whether the film suffered rupture, dissolution, excessive shrinkage and/or whitening. The film with no abnormality was marked with "○", and the film which had abnormality was marked with "X".

(7) Microwave Oven Test 2 (Hot oleaginous food resistance test)

Gratin of normal temperature was heaped up on a casserole, wrapped up with a wrapping film such that the film would contact the gratin, then placed in a microwave oven (high frequency output: 500 W) and treated therein for 5 minutes. The casserole was taken out and the condition of the film was observed to see whether the film suffered rupture, dissolution, excessive shrinkage and/or whitening. The film with no abnormality was marked with "○", and the film which had a abnormality was marked with "X".

(8) Adhesive Strength

The 50 μm thick single-layer films corresponding to the intermediate layer and the adhesive layer were prepared, and these single-layer films were laminated to have the structure of "intermediate layer/adhesive layer/intermediate layer", held between the 215° C. hot plates and pressed under 0.2 MPa (2 kg/cm$^2$) for 2 seconds to obtain a laminated film, and its T-peel strength was measured by pulling it at a rate of 50 mm/min at 23° C. With respect to the adhesive layer and the outer layers, the similar single-layer films were prepared and they were laminated to have an "outer layer/adhesive layer/outer layer" structure, held between the 200° C. hot plates and pressed under the same conditions as described above to obtain a laminated film. In its T-peel test, this film suffered no exfoliation.

Listed below are the materials used in the Examples and the Comparative Examples.

(a) PBT-1: Polytetramethylene terephthalate resin; intrinsic viscosity: 1.2; melting point: 225° C.: crystallization temperature: 170° C.

(b) PBT-2: Polytetramethylene terephthalate copolymer resin obtained from 5 mol % copolymerization of dimethyl isophthalate; intrinsic viscosity: 1.05; melting point: 218° C.; crystallization temperature: 166° C.

(c) PBT-3: Polytetramethylene terephthalate copolymer resin obtained from 1.2 mol % copolymerization of polytetramethylene oxide glycol having a molecular weight of 1,000 (polytetramethylene oxide glycol residue: 10 wt %); intrinsic viscosity: 1.15; melting point: 225° C.; crystallization temperature: 168° C.

(d) PBT-4: Polytetramethylene terephthalate resin; intrinsic viscosity: 1.0; melting point: 225° C.; crystallization temperature: 172° C.

(e) PBT-5: Polytetramethylene terephthalate resin; intrinsic viscosity: 0.6; melting point: 225° C.; crystallization temperature: 175° C.

(f) PBT-6: Polytetramethylene terephthalate resin; intrinsic viscosity: 1.06; melting point: 225° C.; crystallization temperature: 185° C.

(g) PBT-7: Polytetramethylene terephthalate copolymer resin obtained by copolymerizing 35 mol % of isophthalic acid; intrinsic viscosity: 1.0; melting point: 161° C.; crystallization temperature: 85° C.

(h) LDPE: Low-density polyethylene resin; melt index=3.

(i) PP: Propylene-ethylene random copolymer polypropylene resin; melt index=8.

(j) AD-1: Polyethylene resin modified with 2,000 ppm of maleic anhydride; melt index=2.

(k) AD-2: Polypropylene resin modified with 2,000 ppm of maleic anhydride; melt index=4.

Example 1

Using PBT-1 as the intermediate layer resin, LDPE as the outer layer resin and AD-1 as the adhesive, these materials were extruded from a 3-material and 5-layer T-die extruder at a die temperature of 240° C. with the cylinder temperature being set at 250° C., 210° C. and 210° C., respectively, so that the laminate would have a layer thickness ratio of outer layer/adhesive layer/intermediate layer/adhesive layer/outer layer=2/1/3/1/2, and taken up by a cooling roll at 30° C. to obtain a 35 μm thick laminated film. This film was stretched 3.5 times in the machine direction at a stretcher temperature of 80° C., then heat set at 160° C. for 10 seconds and cooled to obtain a 10 μm thick laminated stretched film. This laminated stretched film showed good stretchability without suffering rupture, exfoliation, whitening, etc., and proved to be a uniform transparent film. The obtained film was subjected to the above-described items of evaluation. The results are shown in Table 1.

Example 2

Using the resins shown in Table 1 and conducting the same procedure as defined in Example 1, a 10 μm thick multi-layer film having a layer thickness ratio shown in Table 1 was produced and subjected to the said items of evaluation. The results are shown in Table 1.

Example 3

Using the resins shown in Table 1 and conducting the same procedure as defined in Example 1 except that the extruder cylinder temperature for PP and AD-2 was set at 230° C., a 10 μm thick multi-layer film having a layer thickness ratio shown in Table 1 was produced and subjected to the said items of evaluation. The results are shown in Table 1.

Examples 4 and 5

Using the resins shown in Table 1 and conducting the same procedure as defined in Example 1 except that the stretching temperature in the film forming operation was set at 60° C., the 10 μm thick multi-layer films having the layer thickness ratios shown in Table 1 were produced and subjected to the said items of evaluation. The results are shown in Table 1.

Example 6

Using PBT-4 as the intermediate layer resin and a 10% blend of AD-1 as the outer layer resin, the materials were extruded from a 2-material and 3-layer T-die extruder using a circular die, at a blow-up ratio of 1.2, with the die temperature set at 240° C. and the cylinder temperature set at 250° C. and 210° C., respectively, so that the laminate would have a layer thickness ratio of outer layer/intermediate layer/outer layer=2/3/2, then cooled by 26° C. cooling water and taken up to obtain a 40 μm thick laminated film. This film was stretched 3 times in the machine direction at a stretcher temperature of 80° C., then heat set at 160° C. for 10 seconds and cooled to obtain a 13 μm thick laminated stretched film. This laminated film showed good stretchability without suffering rupture, exfoliation, whitening, etc., and proved to be a uniform transparent film. The results of the said items of evaluation on the obtained film are shown in Table 1.

TABLE 1

|  | Example 1 | Example 2 | Example 3 |
|---|---|---|---|
| Outer layer/thickness (μm) | LDPE/2 | LDPE/2 | PP/2 |
| Adhesive layer/thickness (μm) | AD-1/1 | AD-1/1 | AD-2/1 |
| Inner layer/thickness (μm) | PBT-1/3 | PBT-1/5 | PBT-1/3 |
| Adhesive layer/thickness (μm) | AD-1/1 | AD-1/1 | AD-2/1 |
| Outer layer/thickness (μm) | LDPE/2 | LDPE/2 | PP/2 |
| Film thickness (μm) | 10 | 10 | 10 |
| Extrudability | ○ | ○ | ○ |
| Stretchability | ○ | ○ | ○ |
| Adhesive strength (N/15 mm) | 3.43 | 3.43 | 3.63 |
| F5 value (MPa) | 16.7 | 20.6 | 22.6 |
| Elongation at break, transverse/longitudinal | 4.3 | 5.1 | 4.6 |
| Tensile elongation at break in the longitudinal direction (%) | 120 | 100 | 110 |
| Haze (%) | 1.6 | 1.8 | 1.9 |
| Easiness to cut | ○ | ○ | ○ |
| Wrapping performance | ○ | ○ | ○ |
| Microwave oven test 1 | ○ | ○ | ○ |
| Microwave oven test 2 | ○ | ○ | ○ |

|  | Example 4 | Example 5 | Example 6 |
|---|---|---|---|
| Outer layer/thickness (μm) | LDPE/2 | LDPE/2 | LDPE/3.7 |
| Adhesive layer/thickness (μm) | AD-1/1 | AD-1/1 | — |
| Inner layer/thickness (μm) | PBT-2/3 | PBT-3/3 | PBT-4/5.6 |
| Adhesive layer/thickness (μm) | AD-1/1 | AD-1/1 | — |
| Outer layer/thickness (μm) | LDPE/2 | LDPE/2 | LDPE/3.7 |
| Film thickness (μm) | 10 | 10 | 10 |
| Extrudability | ○ | ○ | ○ |
| Stretchability | ○ | ○ | ○ |
| Adhesive strength (N/15 mm) | 3.04 | 3.24 | 0.88 |
| F5 value (MPa) | 14.7 | 11.8 | 19.6 |
| Elongation at break, transverse/longitudinal | 3.5 | 4.3 | 5.0 |
| Tensile elongation at break in the longitudinal direction (%) | 130 | 170 | 80 |
| Haze (%) | 1.2 | 1.5 | 2.3 |
| Easiness to cut | ○ | ○ | ○ |
| Wrapping performance | ○ | ○ | ○ |
| Microwave oven test 1 | ○ | ○ | ○ |
| Microwave oven test 2 | ○ | ○ | ○ |

Comparative Example 1

It was tried to make a laminated film by conducting the same procedure as defined in Example 1 except for use of PBT-5 as the intermediate layer resin, but because of low melt viscosity of PBT-5, it was impossible to conduct stable extrusion. So, a film was made by lowering the cylinder temperature to 240° C. and the die temperature to 235° C., and it was tried to stretch this film in the same way as conducted in the above Examples, but the film ruptured and no stretched film could be obtained.

Comparative Example 2

A multi-layer film was made by conducting the same procedure as defined in Example 1 except for use of PBT-6 as the intermediate layer resin, and the film was evaluated. However, in the course of the extruding operation, there were formed fish eyes in the film due to defective melting of the resin, so it was tried to form the film by re-adjusting the die temperature to 250 to 260° C., but the film could not be taken up stably because of reduced melt viscosity. When a stretching test was conducted on the initial extruded film, the fish eye portions of the film remained non-stretched and it was impossible to obtain a uniform film.

Comparative Example 3

Using the resins shown in Table 2 and conducting the same procedure as defined in Example 1, a 10 μm thick multi-layer film having a layer thickness ratio shown in Table 2 was produced and subjected to the said items of evaluation. The results are shown in Table 2.

TABLE 2

|  | Comp. Example 1 | Comp. Example 2 | Comp. Example 3 |
|---|---|---|---|
| Outer layer/thickness (μm) | LDPE/2 | LDPE/2 | LDPE/2 |
| Adhesive layer/thickness (μm) | AD-1/1 | AD-1/1 | AD-1/1 |
| Inner layer/thickness (μm) | PBT-5/3 | PBT-6/3 | PBT-7/3 |
| Adhesive layer/thickness (μm) | AD-1/1 | AD-1/1 | AD-1/1 |
| Outer layer/thickness (μm) | LDPE/2 | LDPE/2 | LDPE/2 |
| Film thickness (μm) | 10 | 10 | 10 |
| Extrudability | X | X | ○ |
| Stretchability | X | X | ○ |
| Adhesive strength (N/15 mm) | — | — | >5 |
| F5 value (MPa) | — | — | 12.7 |
| Elongation at break, transverse/longitudinal | — | — | 2.7 |
| Tensile elongation at break in the longitudinal direction (%) | — | — | 90 |
| Haze (%) | — | — | 1.2 |
| Easiness to cut | — | — | ○ |
| Wrapping performance | — | — | ○ |
| Microwave oven test 1 | — | — | ○ |
| Microwave oven test 2 | — | — | X |

What is claimed is:

1. A multi-layer packaging film comprising an intermediate layer having at least one outer layer on both surfaces of the intermediate layer, and having the thickness of not more than 40 μm, said outer layer comprising a polyolefin resin, said intermediate layer comprising a polytetramethylene terephthalate resin which is constituted by polytetramethylene terephthalate units of 70 to 99 mol %; is obtained by copolymerizing polytetramethylene oxide glycol having a number-average molecular weight of 300 to 5,000; and has an intrinsic viscosity of 0.7 to 2.0, a melting point of 200 to 228° C. and a crystallization temperature of not higher than 180° C., and the thickness of said intermediate layer being 20 to 80% of the thickness of the multi-layer film.

2. The multi-layer packaging film according to claim 1, wherein the thickness ratio of one outer layer to the other outer layer is 0.5 to 2.

3. The multi-layer packaging film according to claim 1, wherein the intermediate layer has a melting point of 200 to 224° C.

4. The multi-layer packaging film according to claim 1, wherein the outer layers comprise a polyethylene resin or a polypropylene resin.

5. The multi-layer packaging film according to claim 1, which is produced by co-extruding a polytetramethylene terephthalate resin and a polyolefin resin, stretching and heat setting the extrudate.

6. The multi-layer packaging film according to claim 1, wherein an adhesive layer is disposed between the intermediate layer and each of the outer layers.

7. The multi-layer packaging film according to claim 6, wherein the adhesive is a modified polyolefin resin.

8. The multi-layer packaging film according to claim 6, wherein the adhesive strength between the adhesive layer and the intermediate layer is not less than 0.5 N/15 mm (50 g/15 mm) at 23° C.

9. The multi-layer packaging film according to claim 6, which is produced by co-extruding a polytetramethylene terephthalate resin, an adhesive and a polyolefin resin, stretching and heat setting the extrudate.

10. The multi-layer packaging film according to claim 1, wherein the strength of the multi-layer wrapping film at 5% elongation is 5 to 50 MPa (0.5 to 5.0 kg/mm$^2$).

11. A food packaging comprising the multi-layer packaging film as defined in claim 1.

12. A stretched film for food packaging comprising the multi-layer packaging film as defined in claim 1.

13. A wrapping film for food packaging comprising the multi-layer packaging film as defined in claim 1.

* * * * *